Figure 1:
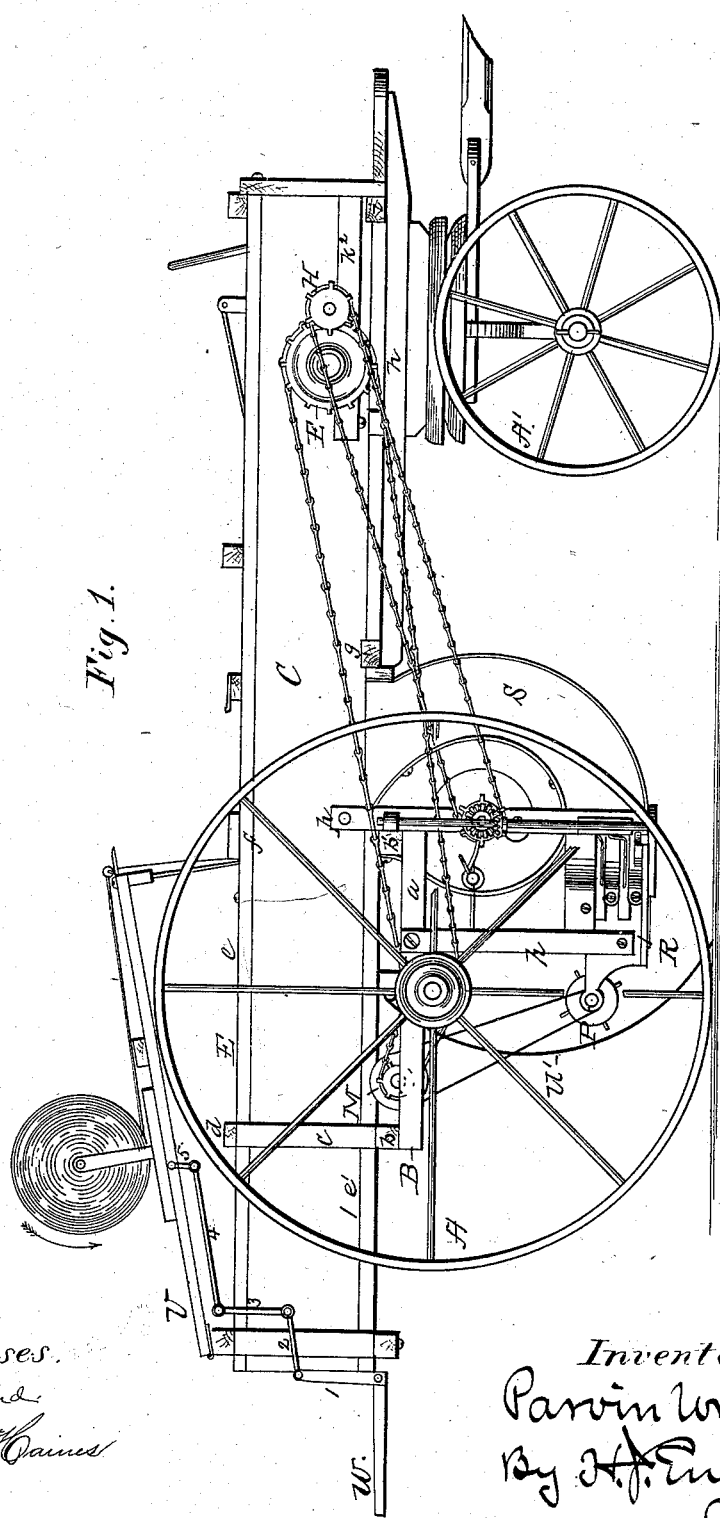

(No Model.) 5 Sheets—Sheet 2.

P. WRIGHT.
TRAVELING HAY PRESS.

No. 254,758. Patented Mar. 7, 1882.

Witnesses.

Inventor.
Parvin Wright
By H. J. Ennis atty.

(No Model.) 5 Sheets—Sheet 3.
P. WRIGHT.
TRAVELING HAY PRESS.
No. 254,758. Patented Mar. 7, 1882.
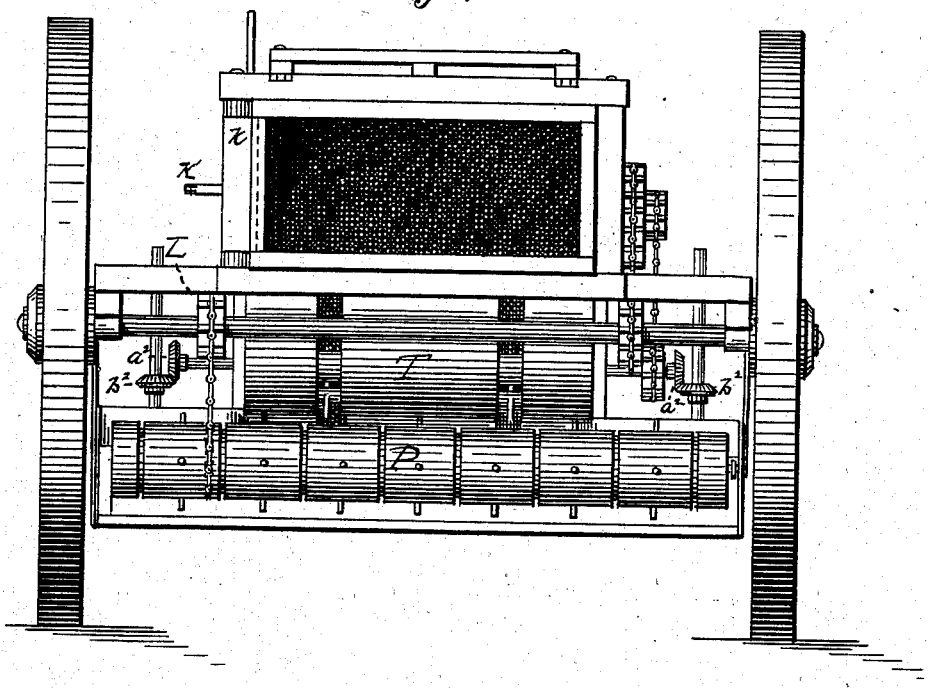

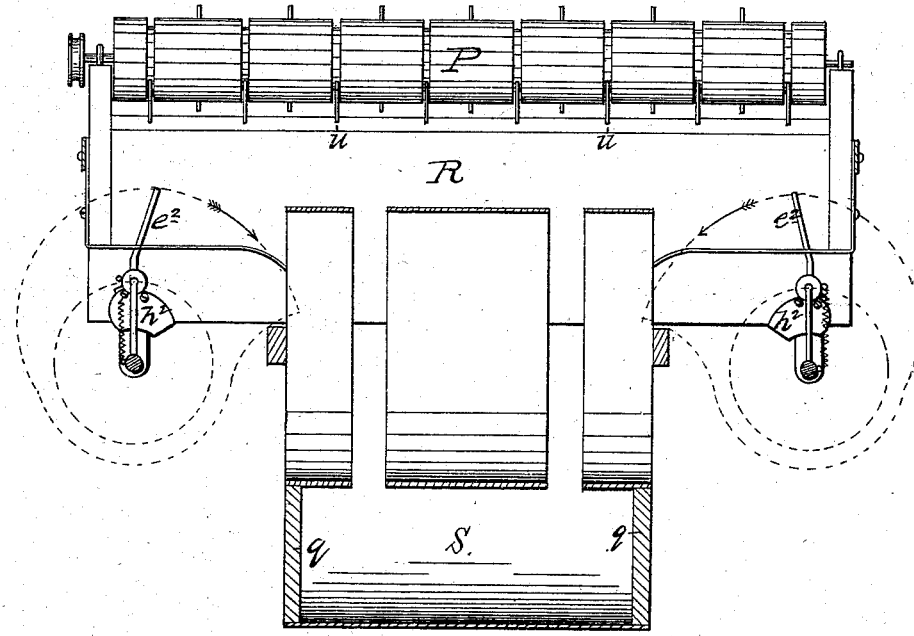

(No Model.)　　　　　　　　P. WRIGHT.　　　　　5 Sheets—Sheet 5.
TRAVELING HAY PRESS.
No. 254,758.　　　　　　　　　　　Patented Mar. 7, 1882.
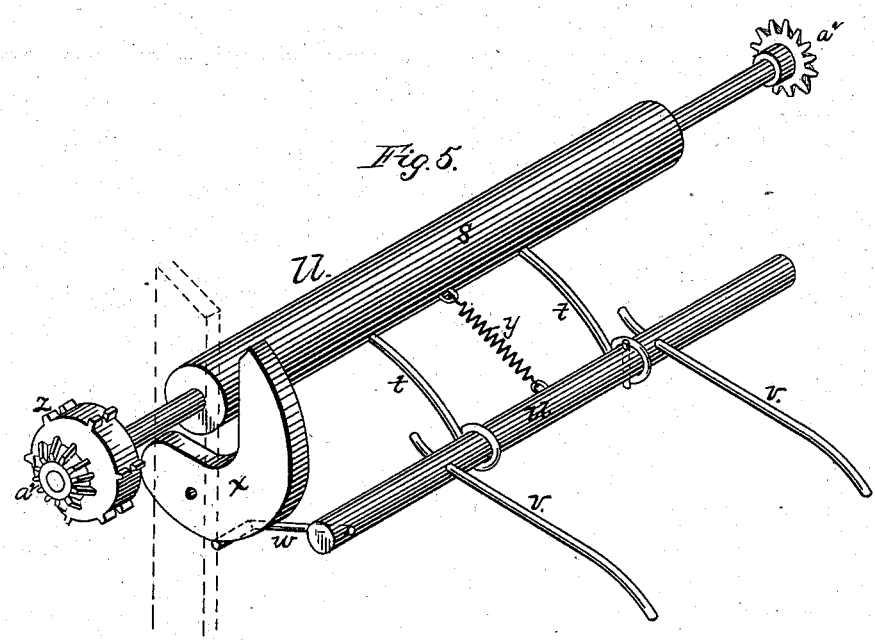
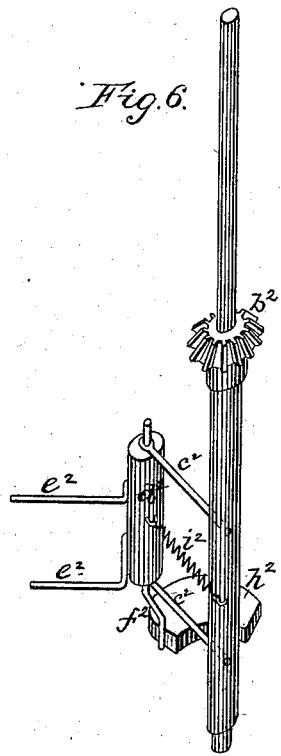
Witnesses:　　　　　　　　　　　　　　　　Inventor:

UNITED STATES PATENT OFFICE.

PARVIN WRIGHT, OF GRANITE, COLORADO, ASSIGNOR TO WILLIAM F. DIETERICHS AND CONRAD SCHAEFER.

TRAVELING HAY-PRESS.

SPECIFICATION forming part of Letters Patent No. 254,758, dated March 7, 1882.

Application filed February 1, 1882. (No model.)

*To all whom it may concern:*

Be it known that I, PARVIN WRIGHT, a citizen of the United States, residing at Granite, in the county of Chaffee and State of Colorado, have invented certain new and useful Improvements in Traveling Hay-Presses; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention has relation to improvements in that class of machines known as "traveling hay-presses," the objects of which are to provide a succession of mechanical operations for taking up hay and similar material from the ground, compressing it into bales, tying the bales, and ejecting them from the machine ready for transportation.

My improvement in the present case consists in a solid reciprocating traverser or plunger formed with vertical passages on the face side, operating in a box capable of receiving and discharging hay and similar material, in combination with operating mechanism actuated by the progression of the machine.

My improvement further consists in a compressing means attached to the side and end of the discharge end of the box and actuated by a lever from the driver's seat.

My improvement further consists in a reciprocating traverser or plunger operating in a box or chamber by mechanism actuated by the progression of the carrying means, in combination with a compressing means by which the receiving box or chamber is made narrower at the exit.

My improvement further consists in a compressing means attached to the side and end of the discharge end of the box or chamber, in combination with a receiving box or chamber formed with a movable side wall operated by a lever so as to move at the end between the upper and lower walls thereof.

My improvement further consists in a receiving box or chamber, a reciprocating plunger operating therein, and a side cam, in combination with binding means, as hereinafter set forth.

My improvement further consists in a rake and a revolving shaft or roller, provided with studs or pins to lift or strip the hay from the rake, and annular grooves wherein project fingers intended to shed the hay from the roller and deposit it in a receiving-box.

My improvement further consists in a rake or revolving shaft provided with studs or pins and formed with annular grooves wherein engage fingers or prongs operating to remove the hay from the shaft, in combination with a receiving-box.

My improvement further consists in a receiving-box formed with a back piece provided with prongs or fingers engaging or working in annular grooves of a revolving shaft, having its end pieces slotted at the front, and scroll-shaped front pieces with corresponding slots or openings, as hereinafter stated.

My improvement further consists in side revolving forks on vertical revolving shafts, the prongs of the forks hinged or pivoted to a frame set in the shaft and operating in the slots of the end and front walls of the receiving-box.

My improvement further consists in a side fork fixed to a frame in a vertical shaft and revolving on a frame with said shaft, and a cam-shaped block fixed on the floor of the receiving-box, in combination with a crank on the end of the shaft to which the prongs are attached.

My improvement further consists in a receiving-box with fronts scrolled and slotted, and leading into and attached to a chute formed as hereinafter stated, and opening into the compressing chamber or box.

My improvement further consists in a revolving lifting means consisting of prongs set into a rod and secured to arms, said prongs reaching through slots in the drum of the chute, and sweeping over the bottom thereof.

My improvement further consists in revolving lifting means consisting of prongs set into a rod and secured to arms and sweeping over the bottom of a chute, in combination with side forks, as hereinafter stated.

My improvement further consists in the novel construction and combination of parts, as will be hereinafter more fully described.

Figure 2:
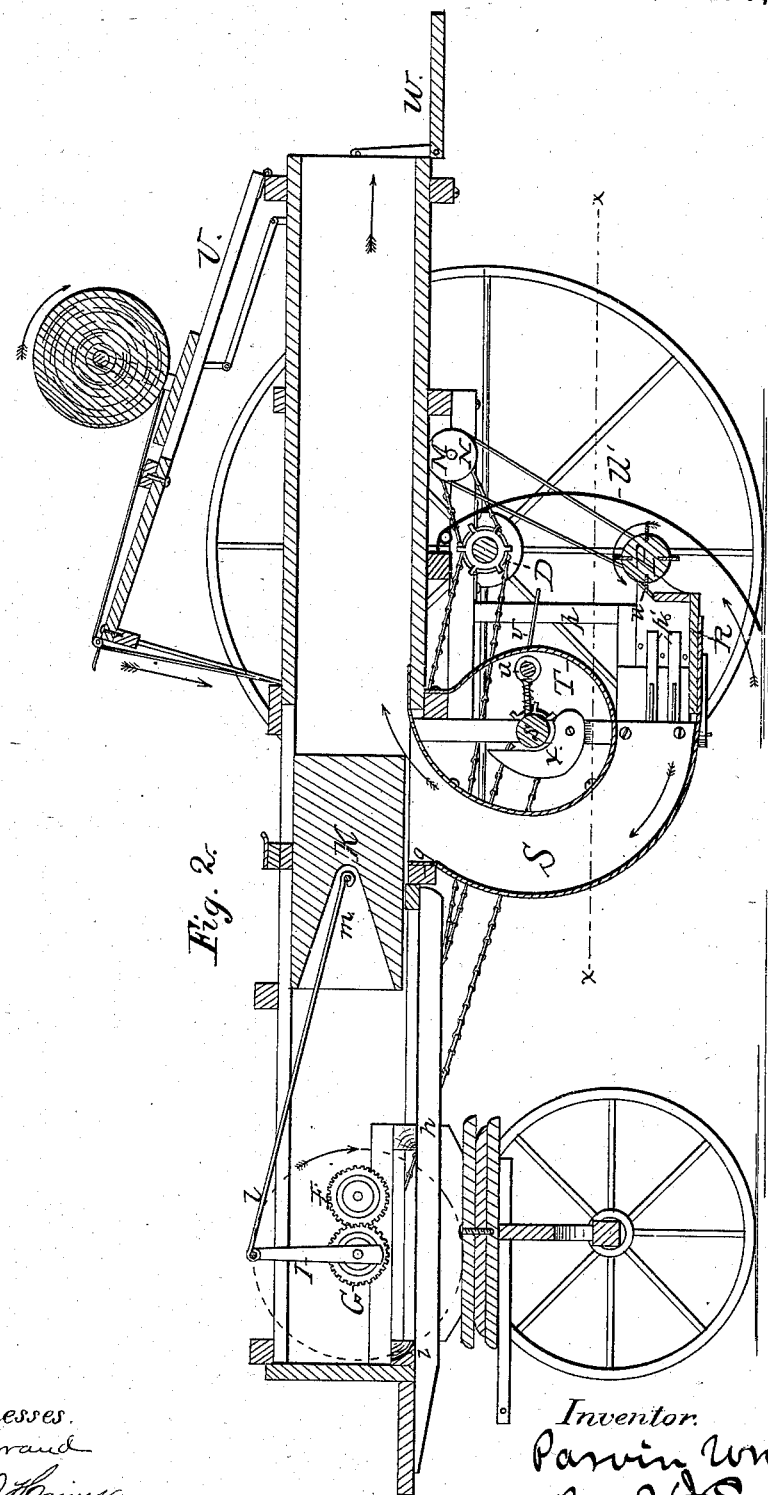

In the accompanying drawings, Figure 1 is a side view of my improved machine. Fig. 2 is a longitudinal central sectional view of the same. Fig. 3 is a rear view of the machine. Fig. 4 is a plan view of the revolving-roller receiving-box and slotted chute-box, taken through the lines x x of Fig. 2; and Figs. 5 and 6 are perspective views of the elevating and side rakes.

The letters A and A' represent the wheels of the machine, on which the baling-box and compressor are mounted, and the former of which acts, in the progression of the machine, as the motive power for actuating the connected mechanism. On the axle of the hind wheels rests, by suitable journal-bearings, the frame B, composed of the side beams, a, and transverse beams b and b'. In the transverse beam b are set securely the uprights c, between which the rear portion of the baling-box fits, and is further secured by a cross-bar, d, fastened firmly on the tops or ends of the uprights.

The letter C represents the baling-box, formed with continuous sides and extending top and bottom e and e'. From about and forward of the cross-bar f the top of the baling-box is formed of side boards, each extending from the edge about one-third of the width of the baling-box, thus leaving uncovered and open a central space of about one-third the width of the box on top, and besides being secured to the side boards of the box these top boards are secured by cross-pieces bolted or otherwise secured across the top of the box. In front of the lifting device is the cross-piece g, and to this, and extending forward over the bed-blocks of a fifth-wheel, are the beams h, secured to the cross-piece i, substantially as seen in the drawings in Fig. 1.

One of the side boards of the baling-box, (see Fig. 3,) near the discharge, is left free and unsecured to the top and bottom, and in the cross-beams on that side, outside of the box, is journaled an upright or bar, k, formed with an inner cam-shaped face, and provided with a bolt or arm, to which is attached a rod, k', which extends therefrom along the box to the forward end, where it is connected to a lever-handle, by which means the cam is operated and the free end of the side board forced inward or released, at the will of the driver or operator on the seat, located at the forward end of the machine.

Fixed to the rear axle of the carriage (see Fig. 2) is the sprocket-wheel D, provided with a sprocket-chain extending therefrom to the sprocket-wheel E, over which it passes. This sprocket-wheel E is mounted on a journal, which is suitably arranged on the bar $k^2$, and this journal has fixed on the other end a spur-wheel, F, (see Fig. 2,) which in turn meshes into the spur-wheel G, likewise fixed on the bar $k^2$, and its shaft, extending outside of the baling-box, has affixed on the outer end the sprocket-wheel H, (see Fig. 1,) over which passes a sprocket-chain, for the purpose hereinafter stated.

To the inside face of the spur-wheel G (see Fig. 2) is rigidly fixed the crank-arm I, to the outer end of which is connected the rod l, extending to and attached to the bolt of the reciprocating traverser K. This traverser K, which is made of one piece to secure firmness, is formed with a central vertical triangular slot, m, in the angle of which is pivotally attached one end of the connecting-rod l. The face of this traverser is also formed with two or more vertical slots, for the purpose of inserting the baling-wires, and also in order that the fingers of the revolving fork may find retreat in revolution; and on the top of the traverser is a guide or cleat cross-bar, which prevents it from dropping or tilting down when over the chute; also, on the rear of the slide is attached a spring-catch, which, when the wire-inserting apparatus is down, catches into a projecting piece of wood or metal and prevents the wire-inserters from coming up before the wire-tyers can operate. This traverser K in exterior dimensions corresponds to the inside dimensions of the baling-box, and in length is suitable to the distance to be traversed.

On the rear axle of the carriage is another spocket-wheel, L, provided with engaging-chain, which extends to another spocket-wheel, M, journaled to the beam of the carriage, and on the shaft thereof is the pulley N, in the groove of which a band operates, extending around a pulley on the revolving rake-stripper, and serves as the actuating means for this device.

The letter P represents the revolving rake-stripper, formed with a series of annular grooves, into which reach the fingers or shedders u of the cross-board of the receiving-box.

The letter R (see Figs. 2 and 4) represents the receiving-box, formed of a width preferably corresponding to that of the frame on the axle of the carriage, to which it is attached by the bars p, and in its forward part gradually approaches the drum of the elevator. The ends and front of this receiving-box are formed with the lateral slots p', intended for the purpose hereinafter described.

The letter S represents the curved chute of the elevator, which has circular side pieces, q, fixed to the bars p and the under side of the side-pieces of the box, and this drum is closed with metallic sheeting on the outside.

The letter T represents the inside drum inclosing or surrounding the lifting means. This drum is formed of sheet metal, and preferably consists of sectional pieces so arranged that interstices are formed between the sections, the outer section being fixed to the rear faces of the side pieces of the chute, and from thence brought round and attached securely to the cross-beam of the frame, and the central section or sections are attached to the inner side of the cross-beam of the frame and then brought around and fixed to the other side of the cross-beam.

The letter U (see Fig. 5) represents the lifting means, consisting of a shaft, s, journaled in the bars or beams p, and having rigidly fixed to said shaft the arms t, the ends thereof encircling and inclosing, so as to admit of revolution, another shaft, $u'$, provided with fingers or teeth $v$, and on the end of the shaft $u'$ is a finger, $w$, which engages with the cam-block $x$, in order that the shaft $u'$ may be thrown from engagement with the hay at the proper time in its revolution, and a retractile spring, $y$. The fingers or teeth of the shaft $u'$ register with and extend through the spaces in the drum, as seen in Fig. 2 of the drawings.

On the end of the shaft $s$ is a sprocket-wheel, $z$, which is connected with the sprocket-wheel H by a chain, and by this means the mechanism of the lifting device is operated. On the ends of the shaft $s$ is also fixed the bevel-gear wheel $a^2$, which engages with its fellow, fixed to the upright shafts $b^2$, attached to the cross-beam of the frame and to a bearing fixed on the receiving-box, as shown in Fig. 4. To these upright shafts, near the lower ends, (see Fig. 6,) are fixed the arms $c^2$, in which is pivotally journaled the oscillating shaft $d^2$, provided with fingers $e^2$ and the trip-arm $f^2$. These fingers $e^2$ register with and move through the slots in the end and rear side of the receiving-box, and the trip-arm $f^2$ follows the form of the cam-blocks $h^2$, fixed on the floor of the receiving-box, and governs the sweep in its revolution as it reaches the end of the slots, and a retractile spring, $i^2$, for returning the shaft $d^2$ to its normal position.

The letter U' represents the rake-teeth, attached to the usual cross-bar or rake-head, arranged under the baling-box, and they may be of any suitable or convenient kind.

The letter V (see Figs. 1 and 2) represents the hinged frame, arranged on the upper surface of the baling-box, carrying the reel of binding-wire and moving in the arc of a circle. The forward end of this frame is provided with two or more wire-carrying fingers for introducing and inserting the wires for binding into the box. Since this hinged frame and its adjuncts and the operation are substantially similar to that shown and described in my pending application filed November 15, 1880, further description is not deemed necessary.

The mechanism or means for twisting the ends and forming the knots on the binding-wire around the bale of hay are not illustrated in the accompanying drawings, nor herein described, for the reason that I reserve the right to elect either the devices shown in my United States Letters Patent No. 230,100 or my pending application filed November 15, 1880, the location and arrangement being substantially the same as shown in my pending case, already herein stated.

To the hinged frame V is connected an end door, W, for the baling-box, connected by the jointed levers 1, 2, 3, 4, and 5, and operated by the movement of the said frame.

Operation: As the machine passes through the field the hay is taken up by the rake-teeth and stripped off the rake-teeth by the revolving stripper and deposited in the receiving-box, when the side revolving forks, operated by the bevel-gears, force and concentrate the hay into the mouth of the curved chute and in contact with the fingers of the elevating-fork, which carries it up through the chute into the baling-box, and the reciprocating traverser forces it through the press or baling-chamber, where it is compressed, then passing the binding-wire around a quantity to form a bale, forming the knots on the binding-wires, and finally ejecting the formed bale by the succeeding incoming hay as forced forward by the traverser.

In case a regular uniform motion of the side and elevating forks is desired, the chain-wheel on the elevating-shaft is moved in line and connected with the chain running from the shaft-gear to the main axle.

What I claim as my invention, and desire to secure by Letters Patent, is—

1. In a baling-press, the combination of the bale-chamber with the rake-teeth and intermediate mechanism for converging and delivering the hay from the teeth to the bale-chamber, as and for the purpose set forth.

2. In a baling-press, the combination, with a baling-box, one of the sides of which is free at the end, of a compressing means for reducing the diameter or passage of the exit end of the baling-box, substantially as described.

3. In a baling-press, the combination, with a baling-box having one of its sides free at the exit end, of the compressing means attached to the side and end of the discharge end of the box and actuated by a lever from the driver's seat, substantially as described.

4. In a traveling press, the combination, with raking-teeth, of a suspended box for receiving the hay or similar material before it is carried to the baling-chamber, substantially as described.

5. In a traveling press, the combination, with raking-teeth, of a revolving rake stripper and a receiving-box, substantially as described, and for the purpose set forth.

6. In a traveling press, the combination, with raking-teeth, of a suspended box for receiving the hay from the raking-teeth, a curved chute leading into the baling-chamber, and means for elevating the hay from the box into the baling-chamber, substantially as described.

7. In a traveling press, the combination of raking-teeth, a suspended box for receiving the hay from the teeth, a curved chute leading into the baling-chamber, and side means for gathering and concentrating the hay in the receiving-box to the chute, substantially as described.

8. In a traveling press, the combination, with raking-teeth, of a revolving roller provided with studs or pins to strip the hay from the raking-teeth, and formed with annular grooves and fingers, attached to a suspended box, fitting in the grooves of the roller for shedding the hay from the roller and depositing it in a receiving-box, substantially as described.

9. In a traveling press, the combination, with a receiving-box and a curved chute leading to the baling-box, of side revolving forks mounted on vertical revolving shafts working in slots in the end and front walls of the receiving-box, substantially as described.

10. In a traveling press, the combination of raking-teeth, a receiving-box, a curved chute, side compressing or concentrating means, a carrier, a feeder, and press, all operating automatically to take the hay from the ground and press it into a bale, substantially as described.

11. In a traveling press, the combination of raking-teeth, a receiving-box, a curved chute, side compressing or concentrating means, a carrier or elevator, a feeder, a press, and a binder, all operating automatically, substantially as described.

12. A revolving shaft, $s$, provided with arms $t$, oscillating shaft $u$, with fingers or arms $v$, and a retractile device, substantially as described.

13. A revolving shaft, $s$, provided with arms $t$, oscillating shaft $u$, with fingers or arms $v$, and trip-arm $w$, and a retractile spring, $y$, substantially as described.

14. The hay-lifting device composed of the revolving shaft $s$, arms $t$, oscillating shaft $u$, fingers $v$, trip-arm $w$, and a retractile spring, $y$, in combination with an eccentric or cam trip device, substantially as described.

15. A revolving vertical shaft provided with arms $c^2$, carrying at the outer ends an oscillating shaft, $d^2$, with fingers $e^2$, substantially as described.

16. A revolving shaft provided with arms $c^2$, carrying at their outer ends an oscillating shaft, $d^2$, with fingers $e^2$ and trip-arm $f$, and a retracting-spring, $i^2$, substantially as described.

17. A means for concentrating the hay in a receptacle that is on its way to a baling-chamber, composed of oppositely-arranged revolving shafts provided with fingers, trip-arms, and retractile springs, in combination with eccentric or cam trip means for guiding the movement of the concentrating means and returning them to normal position, substantially as described.

18. The combination, with a box or receptacle for receiving the hay from the rake, of means for concentrating the hay to a chute leading into a baling-chamber, means for elevating the hay through the chute into the baling-chamber, and trip devices for returning the concentrating and elevating means to their respective positions for further operation.

In testimony whereof I affix my signature in presence of two witnesses.

PARVIN WRIGHT.

Witnesses:
W. D. DODDS,
GEO. R. DELPRAT.